United States Patent
Liu et al.

(10) Patent No.: US 10,067,384 B2
(45) Date of Patent: Sep. 4, 2018

(54) DETECTION UNIT, ARRAY STRUCTURE, LIQUID CRYSTAL DISPLAY DEVICE AND DETECTION METHOD

(71) Applicant: SHENZHEN CHINA STAR OPTOELECTRONICS TECHNOLOGY CO., LTD., Shenzhen, Guangdong (CN)

(72) Inventors: Siyang Liu, Guangdong (CN); Tienhao Chang, Guangdong (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 201 days.

(21) Appl. No.: 15/307,016

(22) PCT Filed: May 23, 2016

(86) PCT No.: PCT/CN2016/082952
§ 371 (c)(1),
(2) Date: Oct. 27, 2016

(87) PCT Pub. No.: WO2017/177509
PCT Pub. Date: Oct. 19, 2017

(65) Prior Publication Data
US 2018/0203303 A1 Jul. 19, 2018

(30) Foreign Application Priority Data

Apr. 14, 2016 (CN) .......................... 2016 1 0230053

(51) Int. Cl.
*G02F 1/13* (2006.01)
*G02F 1/1335* (2006.01)
*G02F 1/1362* (2006.01)

(52) U.S. Cl.
CPC .. *G02F 1/133609* (2013.01); *G02F 1/136286* (2013.01)

(58) Field of Classification Search
None
See application file for complete search history.

(56) References Cited

U.S. PATENT DOCUMENTS

| | | | |
|---|---|---|---|
| 2017/0116940 A1* | 4/2017 | Wang | G09G 3/3648 |
| 2017/0221399 A1* | 8/2017 | Yan | G09G 3/006 |
| 2018/0083194 A1* | 3/2018 | Lee | H01L 27/3276 |

* cited by examiner

*Primary Examiner* — James Dudek
(74) *Attorney, Agent, or Firm* — Soroker Agmon Nordman

(57) ABSTRACT

A detection unit for lighting detection of an LCD, an array structure comprising the detection unit, a liquid crystal display comprising the the array structure, and a detection method for lighting detection of an LCD are provided. Processes of original RGB displays are improved, the shorting bars are reduced, and only one array mask is changed to implement the lighting detection of solid colors and mixed colors in semi-products of RGBW displays, and the production cost can be reduced.

5 Claims, 4 Drawing Sheets

DETECTION UNIT, ARRAY STRUCTURE, LIQUID CRYSTAL DISPLAY DEVICE AND DETECTION METHOD

FIELD OF THE INVENTION

The present invention relates to a technical field of displays, and in particular to a detection unit for a lighting detection of an LCD, an array structure comprising the detection unit, a liquid crystal display comprising the the array structure, and a method for lighting detection of LCD.

BACKGROUND OF THE INVENTION

A main structure of the thin film transistor liquid crystal display (TFT-LCD) has an LCD panel and a back light. The LCD panel has an array structure, a color substrate, and a liquid crystal cell disposed therebetween. With the rapid development of liquid crystal display technology, existing three-color RGB technical cannot meet the current customer demand. Recently, customers pay more attention to four-color RGBW technology with a high transmittance, a high brightness, and a low energy consumption.

During a production process of the display, the liquid crystal cell needs to be lighting detection before the LCD light panels bind to ICs to prevent bad products from entering into the next step. The array structure disposes signal lines corresponding to monochrome data lines. When the liquid crystal cell is tested (cell test), detection signals are inputted in pins corresponding to each signal line, signal lines with same detection signals are shorted connected with a shorting bar.

Refer to FIG. 1, a detection unit of three-color RGB technical displays has three shorting bars (R/G/B) 111, 112, 113 connecting to three pixel signal lines 131, 132, 133 respectively through three pixel pins 121, 122, 123. A cell test step is processed for lighting white/solid red/solid green/solid blue screen to detect the screen quality. Similarly, refer to FIG. 2, a detection unit of four-color RGBW displays has four shorting bars (R/G/B/W) 211, 212, 213, 214 connecting to four pixel signal lines 231, 232, 233, 234 respectively through four pixel pins 221, 222, 223, 224. A cell test step is processed for lighting white/solid red/solid green/solid blue/solid white screen to detect the screen quality.

Four-color RGBW displays are an improved technology over three-color RGB displays. In the process of improving products, manufacturers use existing equipment and processes for reducing the cost. Therefore, in the process of four-color RGBW displays, manufacturers want to reduce components, such as array masks, in the changing design. If the array masks of four-color RGBW displays and those of three-color RGB displays are the same, manufacturers need to prepare a mold for manufacturing the array mask.

However, refer to FIG. 3, in the process of improving three-color RGB displays to four-color RGBW, the array masks could not be changed, the connection of the shorting bars and pins are same as three-color RGB displays (shown FIG. 1), the number of pixel signal lines are changed to four from three, each shorting bar has a white pixel. In the cell test step, which can light a solid white screen, and cannot light a solid color screen. Therefore, the array masks need to be changed, and designers only reduce to change the array mask. If the design of three-color RGB displays with three shorting bars (R/G/B) in FIG. 1 is changed to the design of four-color RGBW displays with four shorting bars (R/G/B/W) in FIG. 2, which need to change 2 or more array masks. Moreover, the array mask of three-color RGB displays does not have enough space to increase the number of the bars on the board, which need to change a new array mask. The array mask is changed more, and the production cost is increased for manufacturers. Therefore, the technical field of four-color RGBW displays need a new design, which can light a solid white screen in the cell test step base on reducing the changes to the array masks.

SUMMARY OF THE INVENTION

An object of the present invention is to solve the problems of excessive short-circuit lines, excessive changes of the array masks, and higher production cost in the production of conventional four-color RGBW displays.

To achieve the above object, the present invention provides a detection unit for lighting detection of an LCD, the detection unit comprises a short-circuit line set, at least one lead line set, and at least one signal line set; the short-circuit line set comprises a first short-circuit line, a second short-circuit line, and a third short-circuit line; the lead line set comprises a red pixel lead line connected to the first short-circuit line, a green pixel lead line connected to the second short-circuit line, a blue pixel lead line connected to the third short-circuit line, and a white pixel lead line connected to the second short-circuit line; each signal line set is connected to one of the at least one lead line sets, and comprises a red pixel signal line connected to the red pixel lead line, a green pixel signal line connected to the green pixel lead line, a blue pixel signal line connected to the blue pixel lead line, and a white pixel signal line connected to the white pixel lead line.

To achieve the above object, the present invention provides an array structure comprising the detection unit, the array substrate comprises a display region provided with a liquid crystal therein and at least one date line set, a non-display region surrounding the display region, wherein a detection unit is disposed within the non-display region, wherein each of the date line sets is connected to one of the at least one signal line sets of the detection unit, and comprising a red pixel data line connected to the red pixel signal line, a green pixel data line connected to the green pixel signal line, a blue pixel data line connected to the blue pixel signal line, and a white pixel data line connected to the white pixel signal line.

In one embodiment of the present invention, the liquid crystal display device comprises the array substrate.

To achieve the above object, the present invention provides a detection method for lighting detection of an LCD, the method comprises steps of: connecting at least one date line set to a short-circuit line set through at least one signal line set and at least one lead line set, so as to construct a detection circuit; simulating to input at least one detection signal through at least one detection signal point; lightening a liquid crystal in a display region of the array substrate to display at least one solid color screen and/or at least one mixed color screen in the display region; and under the at least one solid color screen and/or the at least one mixed color screen, detecting whether an abnormal dot or an uneven brightness exists or not, and detecting whether a fan-out of the detection circuit is short or not.

In one embodiment of the present invention, the step of connecting the at least one date line set to the short-circuit line set through the at least one lead line set comprises steps of: connecting a red pixel data line to a first short-circuit line through a red pixel lead line; connecting a green pixel data line to a second short-circuit line through a green pixel lead line; connecting a blue pixel data line to a third short-circuit line through a blue pixel lead line; and connecting a white pixel data line to a second short-circuit line through a white pixel lead line; wherein the order of the four steps can be optionally changed.

Advantage of the present invention is that the present invention provides new technical means, which comprise a detection unit for lighting detection of an LCD, an array structure comprising the detection unit, a liquid crystal display comprising the the array structure, and a detection method for lighting detection of an LCD. Processes of original three-color RGB displays are improved, the shorting bars are reduced, and only one array mask is changed to implement the lighting detection of solid colors and mixed colors in semi-products of four-color RGBW displays, and the production cost can be reduced.

Figure 1:
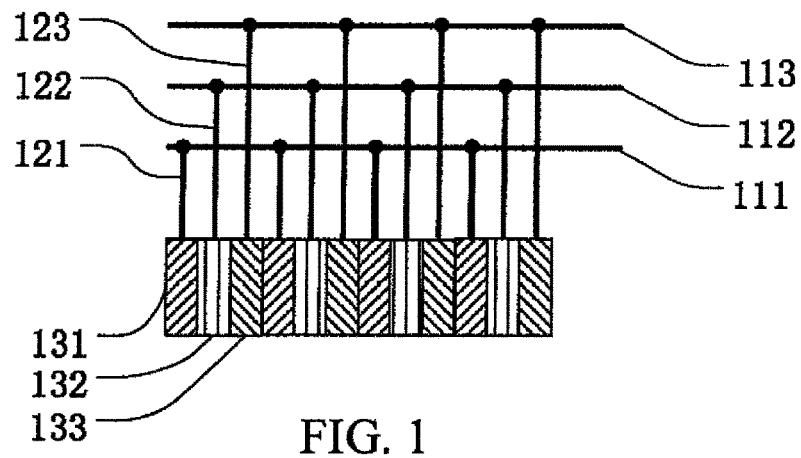
FIG. 1 is a schematic view of a traditional technology of a detection unit of three-color RGB displays.
Figure 2:
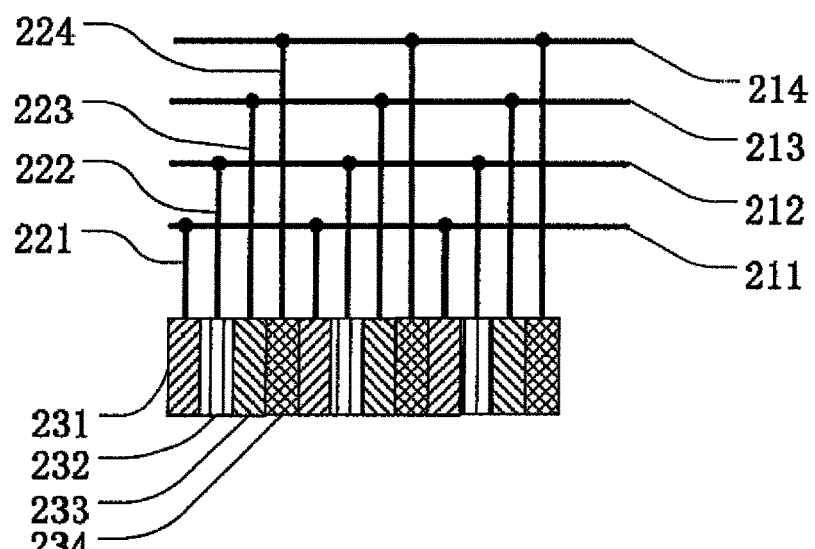
FIG. 2 is a schematic view of a traditional technology of a detection unit of four-color RGBW displays.
Figure 3:
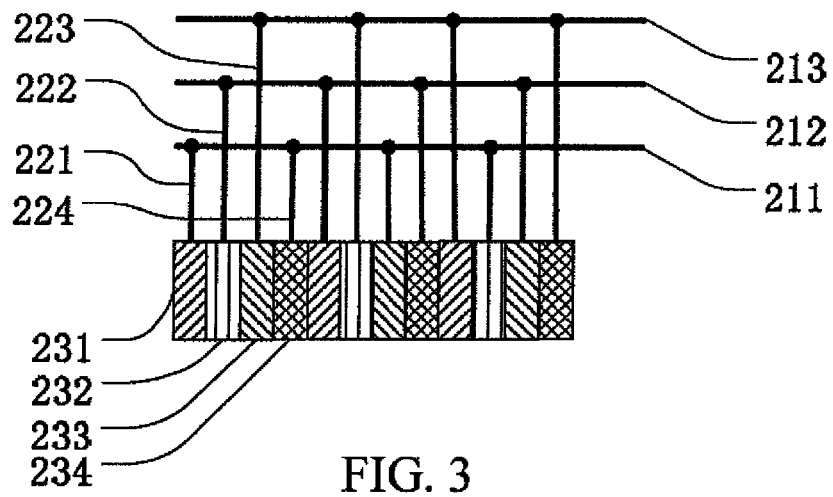
FIG. 3 is a schematic view of four-color RGBW improved from three-color RGB displays without changing array masks.

The figure identified as follows:
1, short-circuit line set; 2, lead line set; 3, signal line set; 4, display region; 5, date line set; 6, non-display region;
11, first short-circuit line; 12, second short-circuit line; 13, third short-circuit line;
21, red pixel lead line; 22, green pixel lead line; 23, blue pixel lead line; 24, white pixel lead line;
31, red pixel signal line; 32, green pixel signal line; 33, blue pixel signal line;
51, red pixel data line; 52, green pixel data line; 53, blue pixel data line;
100, detection unit; 200, array structure; 300, liquid crystal display;
111, shorting bar; 112, shorting bar; 113, shorting bar;
121, pixel pin; 122, pixel pin; 123, pixel pin;
131, pixel signal line; 132, pixel signal line; 133, pixel signal line;
211, shorting bar; 212, shorting bar; 213, shorting bar; 214, shorting bar;
221, pixel pin; 222, pixel pin; 223, pixel pin; 224, pixel pin;
231, pixel signal line; 232, pixel signal line; 233, pixel signal line; 234, pixel signal line.

DETAILED DESCRIPTION OF THE PREFERRED EMBODIMENTS

The following description with reference to the accompanying drawings are preferred embodiments of the present invention, in order to exemplify how the present invention may be implemented, these embodiments may describe the technical content of the present invention to those skilled in the art, so inventive technical content is clearer and easier to understand. However, embodiments of the present invention can be in many different forms, and the scope of the present invention is not limited to the embodiments mentioned in the text.

In the drawings, the same reference numeral with the same parts of the structure that the entire structure or functionally similar components with similar numbers numerals. In the drawings, the size and thickness of each component is arbitrarily illustrated, the utility model is not limited to the size and thickness of each component. To make the illustration clearer, the figures in some places exaggerate appropriate thickness of the part.

When a component is described as "attached to" or "connected to" another component, both can be understood as a direct "install" or "connection", or a component via an intermediate element indirectly "attached to" or "connected to" another component.

Figure 4:
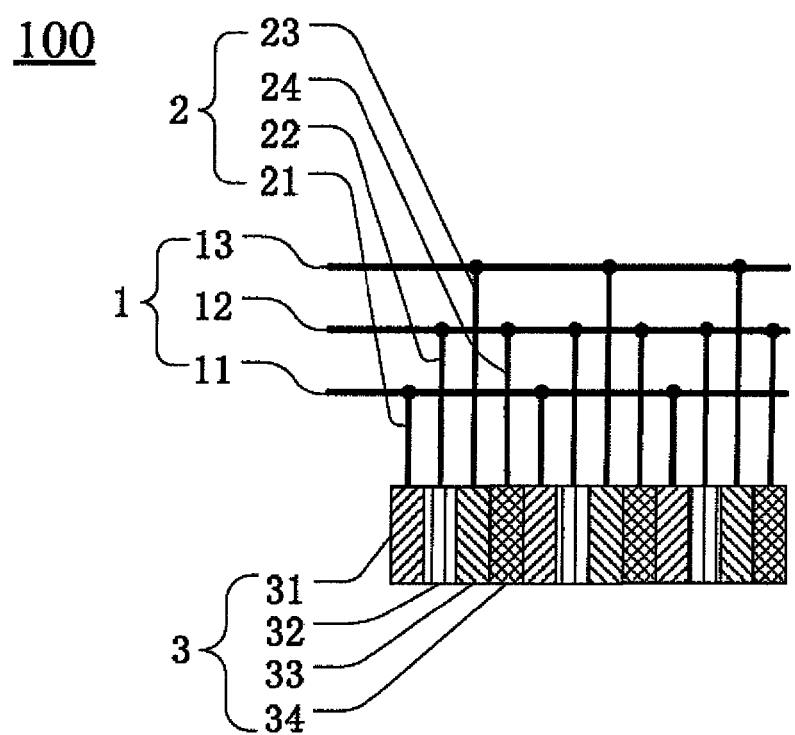
FIG. 4 is a schematic view of a detection unit according to an embodiment of the present invention.

Refer to FIG. 4, a embodiment of the present invention provides a detection unit 100 for lighting detection of an LCD, which comprises a short-circuit line set 1, at least one lead line set 2, and at least one signal line set 3.

The short-circuit line set 1 comprises a first short-circuit line 11, a second short-circuit line 12, and a third short-circuit line 13.

The lead line set 2 comprises a red pixel lead line 21 connected to the first short-circuit line 11, a green pixel lead line 22 connected to the second short-circuit line 12, a blue pixel lead line 23 connected to the third short-circuit line 13, and a white pixel lead line 24 connected to the second short-circuit line 12.

Each of signal line set 3 is connected to one of the at least one lead line set 2, and comprises a red pixel signal line 31 connected to the red pixel lead line 21, a green pixel signal line 32 connected to the green pixel lead line 22, a blue pixel signal line 33 connected to the blue pixel lead line 23, and a white pixel signal line 34 connected to the white pixel lead line 24.

Figure 5:
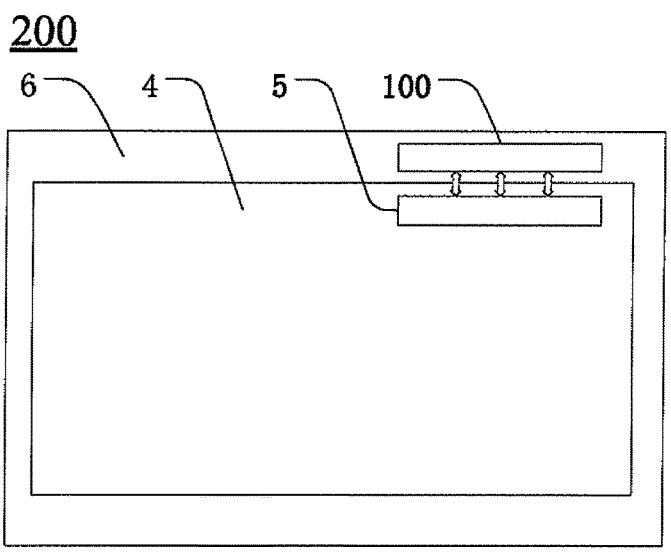
FIG. 5 is a schematic view of an array substrate according to an embodiment of the present invention.
Figure 6:
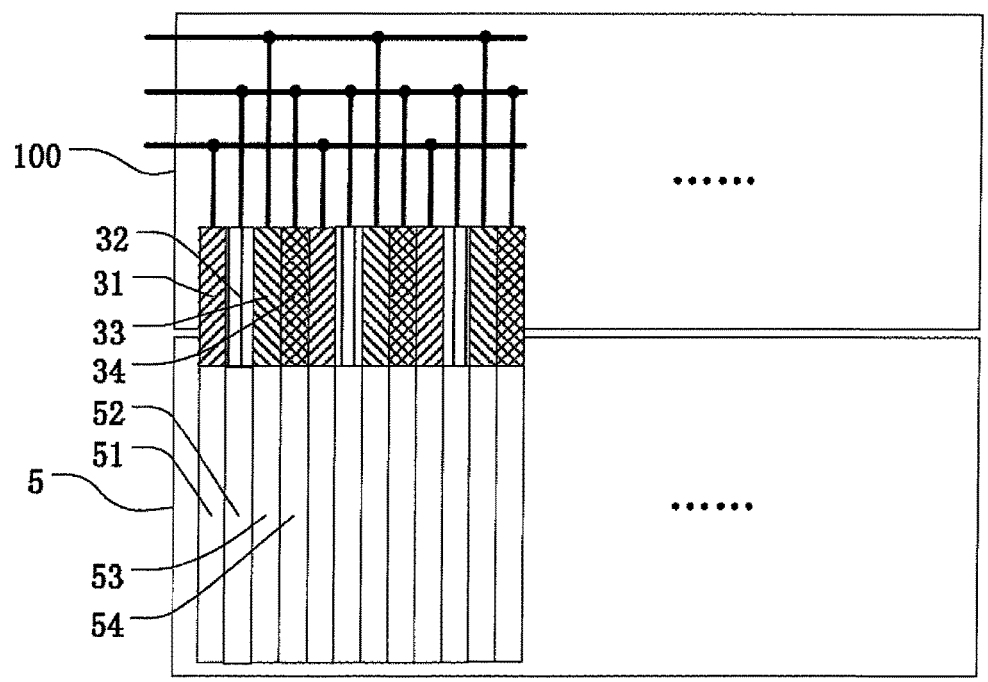
FIG. 6 is a partial enlarged view of a detection unit and a data line set of an array substrate of the present invention.

Refer to FIG. 5, a embodiment of the present invention provides an array structure 200 comprising the detection unit, which comprises a display region 4 provided with a liquid crystal therein (not shown) and at least one date line set 5, a non-display region 6 surrounding the display region 4, wherein a detection unit 100 is disposed within the non-display region 6, Refer to FIG. 6, each of the date line set 5 is connected to one of the at least one signal line set 5, and the signal line set 5 comprises a red pixel data line 51 connected to the red pixel signal line 31, a green pixel data line 52 connected to the green pixel signal line 32, a blue pixel data line 53 connected to the blue pixel signal line 33, and a white pixel data line 54 connected to the white pixel signal line 34.

In the embodiment, the red pixel data line 51 is connected to the first short-circuit line 11 through the red pixel signal line 31 and red pixel lead line 21, and simulating to input at least one detection signal through at least one detection signal point on the first short-circuit line 11, and detecting whether an abnormal dot or an uneven brightness exists or not in solid red at lighting a red light in the display region 4, detecting whether a fan-out of the detection circuit is short or not, and other lighting detection.

Similarly, the blue pixel data line 53 is connected to the third short-circuit line 13 through the blue pixel signal line 33 and the blue pixel lead line 23, and simulating to input at least one detection signal through at least one detection signal point on the third short-circuit line 13, and detecting whether an abnormal dot or an uneven brightness exists or not in solid blue at lighting a blue light in the display region 4, detecting whether a fan-out of the detection circuit is short or not, and other lighting detection.

Moreover, the green pixel data line 52 is connected to the second short-circuit line 12 through the green pixel signal line 32 and the green pixel lead line 22, at the same time, the white pixel data line 54 is connected to the second short-circuit line 12 through the white pixel signal line 34 and the white pixel lead line 24. White pixel and green pixel are shared the same test short-circuit line, and simulating to input at least one detection signal through at least one detection signal point on the second short-circuit line 12, and detects whether an abnormal dot or an uneven brightness exists or not in mixed color with green and white at lighting a green light and white light in the display region 4, detects whether a fan-out of the detection circuit is short or not, and other lighting detection. In the embodiment, the white pixel data line 54 is connected to the second short-circuit line 12 through the white pixel signal line 34 and the white pixel lead line 24. The first short-circuit line 11, the third short-circuit line 13, and the second short-circuit line 12 are adjacent to each other, which can detect a fan-out of the adjacent circuit. The white pixel data line 54 cannot connect to the first short-circuit line 11 or the third short-circuit line 13, and the first short-circuit line 11 and the third short-circuit line 13 are only adjacent to the second short-circuit line 12, which cannot detect a fan-out of all the adjacent circuits.

Figure 7:
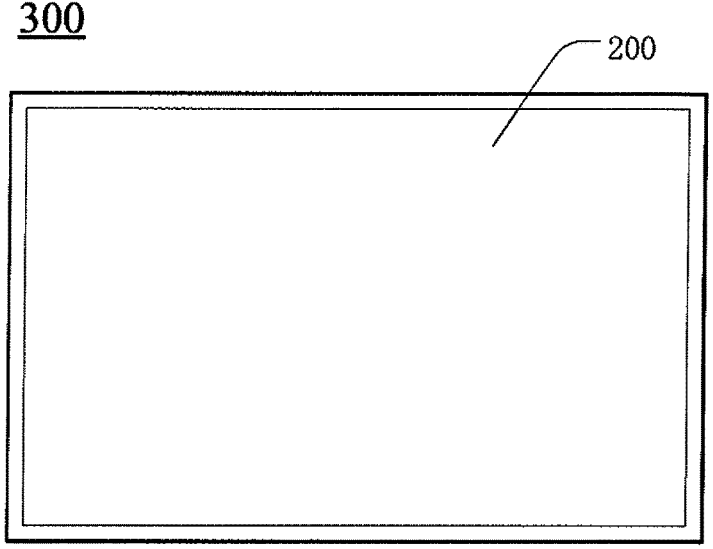
FIG. 7 is a schematic view of a liquid crystal display according to an embodiment of the present invention.

Refer to FIG. 7, an embodiment of the present invention provides a liquid crystal display 300 comprising the the array structure 22, and essential components of display.

Technical effects of the embodiment are that the lighting detection in the mixed color screen of green and white can be implemented by using three test short-circuit lines, and white pixels and green pixels are shared the same test short-circuit line. The lighting detection in the solid color screen of red or blue can be also implemented. Only three test short-circuit lines are adopted in the embodiment, and only one array mask is changed to satisfy the test requirement without adding any test short-circuit line and changing the array mask. It is compatible with the three-color RGB displays, and production costs can be reduced.

Figure 8:
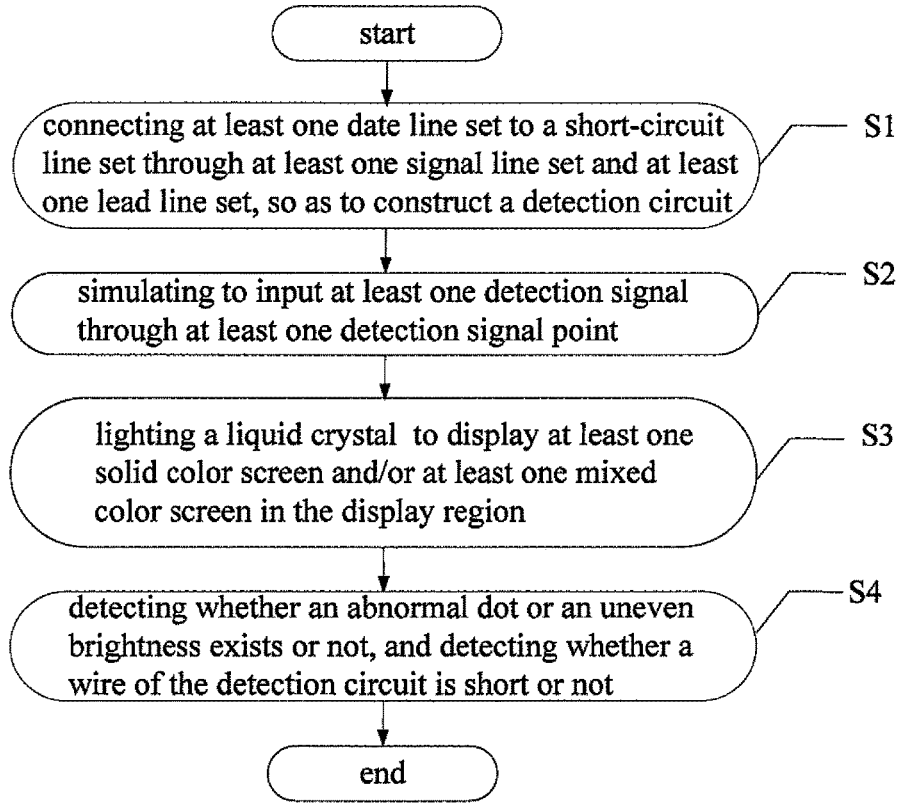
FIG. 8 is a flow chart of a method for lighting detection of an LCD according to an embodiment of the present invention.

Refer to FIG. 8, a embodiment of the present invention provides a method for lighting detection of an LCD, which comprises steps of:

Step S1, connecting at least one date line set to a short-circuit line set through at least one signal line set and at least one lead line set, so as to construct a detection circuit, which comprises steps of: step S101, connecting a red pixel data line to a first short-circuit line through a red pixel lead line; step S102, connecting a green pixel data line to a second short-circuit line through a green pixel lead line; step S103, connecting a blue pixel data line to a third short-circuit line through a blue pixel lead line; step S104, connecting a white pixel data line to a second short-circuit line through a white pixel lead line, wherein the order of the step S101 to step S104 can be optionally changed.

Step S2, simulating to input at least one detection signal through at least one detection signal point. In the embodiment, the red pixel data line 51 is connected to the first short-circuit line 11, and simulates inputting a detection signal through a detection signal point of the first short-circuit line 11 to light the red screen in the display region. The blue pixel data line 53 is connected to the third short-circuit line 13, and simulates inputting a detection signal through a detection signal point of the third short-circuit line 13 to light the blue screen in the display region. The green pixel data line 52 and the white pixel data line 54 are connected to the second short-circuit line 12.

Step S3, lighting a liquid crystal in a display region of the array substrate to display at least one solid color screen and/or at least one mixed color screen in the display region. The display region can be lighted the red screen after simulating to input a detection signal in the first short-circuit line 11. The display region can be lighted the blue screen after simulating to input a detection signal in the third short-circuit line 13. The display region can be lighted the mixed color screen of green and white after simulating to input a detection signal in the second short-circuit line 12.

Under the solid red screen, the solid blue screen and the mixed color screen of green and white, detecting whether an abnormal dot or an uneven brightness exists or not, and detecting whether a fan-out of the detection circuit is short or not, and other lighting detection.

Lighting the blue light in the display region, under the solid blue light, detecting whether an abnormal dot or an uneven brightness exists or not, and detecting whether a fan-out of the detection circuit is short or not, and other lighting detection.

Step S4, under the solid color screen and/or the mixed color screen, detecting whether an abnormal dot or an uneven brightness exists or not, and detecting whether a fan-out of the detection circuit is short or not, and other lighting detection.

Similarly, the blue pixel data line 53 is connected to the third short-circuit line 13 through the blue pixel signal line 33 and the blue pixel lead line 23, and simulating to input at least one detection signal through at least one detection signal point on the third short-circuit line 13, and detecting whether an abnormal dot or an uneven brightness exists or not in solid blue at lighting a blue light in the display region 4, detecting whether a fan-out of the detection circuit is short or not, and other lighting detection.

Moreover, the green pixel data line 52 is connected to the second short-circuit line 12 through the green pixel signal line 32 and the green pixel lead line 22, at the same time, the white pixel data line 54 is connected to the second short-circuit line 12 through the white pixel signal line 34 and the white pixel lead line 24. White pixel and green pixel share the same test short-circuit line, and simulate inputting at least one detection signal through at least one detection signal point on the second short-circuit line 12, and detect whether an abnormal dot or an uneven brightness exists or not in mixed color with green and white at lighting a green light and white light in the display region 4, detecting whether a fan-out of the detection circuit is short or not, and other lighting detection.

The advantage of the present invention is that the present invention provides new technical means, which comprises a detection unit for lighting detection of an LCD, an array structure comprising the detection unit, a liquid crystal display comprising the the array structure, and a detection method for lighting detection of an LCD. Processes of three-color RGB displays are improved, the shorting bars are reduced, and only one array mask is changed to implement the lighting detection of solid colors and mixed colors in semi-products of four-color RGBW displays, and the production cost can be reduced.

The present invention has been described with preferred embodiments thereof and it is understood that many changes and modifications to the described embodiments can be carried out without departing from the scope and the spirit of the invention that is intended to be limited only by the appended claims.

What is claimed is:

1. A detection unit, comprising:
   short-circuit line set, comprising:
   a first short-circuit line;
   a second short-circuit line; and
   a third short-circuit line;
   at least one lead line set, comprising:
   a red pixel lead line connected to the first short-circuit line;
   a green pixel lead line connected to the second short-circuit line;
   a blue pixel lead line connected to the third short-circuit line; and
   a white pixel lead line connected to the second short-circuit line; and
   at least one signal line set, each of which is connected to one of the at least one lead line set, comprising:
   a red pixel signal line connected to the red pixel lead line;
   a green pixel signal line connected to the green pixel lead line;
   a blue pixel signal line connected to the blue pixel lead line; and
   a white pixel signal line connected to the white pixel lead line.

2. An array substrate, comprising:
   a display region provided with a liquid crystal therein and at least one date line set; and
   a non-display region surrounding the display region, wherein a detection unit according to claim 1 is disposed within the non-display region;
   wherein each of the date line set is connected to one of the at least one signal line set of the detection unit, and comprising:
   a red pixel data line connected to the red pixel signal line;
   a green pixel data line connected to the green pixel signal line;
   a blue pixel data line connected to the blue pixel signal line; and
   a white pixel data line connected to the white pixel signal line.

3. The array substrate according to claim 2, wherein the array substrate is applied to a liquid crystal display device.

4. A detection method of an array substrate according to claim 2, comprising steps of:
   connecting at least one date line set to a short-circuit line set through at least one signal line set and at least one lead line set, so as to construct a detection circuit;
   simulating to input at least one detection signal through at least one detection signal point;
   lighting a liquid crystal in a display region of the array substrate to display at least one solid color screen and/or at least one mixed color screen in the display region; and
   under the at least one solid color screen and/or the at least one mixed color screen, detecting whether an abnormal dot or an uneven brightness exists or not, and detecting whether a fan-out of the detection circuit is short or not.

5. The detection method according to claim 4, wherein the step of connecting the at least one date line set to the short-circuit line set through the at least one lead line set comprises steps of:
   connecting a red pixel data line to a first short-circuit line through a red pixel lead line;
   connecting a green pixel data line to a second short-circuit line through a green pixel lead line;
   connecting a blue pixel data line to a third short-circuit line through a blue pixel lead line; and
   connecting a white pixel data line to a second short-circuit line through a white pixel lead line;
   wherein the order of the four steps can be optionally changed.

* * * * *